(12) United States Patent
Izhak-Ratzin et al.

(10) Patent No.: US 9,753,942 B2
(45) Date of Patent: Sep. 5, 2017

(54) TRAFFIC STATISTIC GENERATION FOR DATACENTERS

(71) Applicant: Robin Systems, Inc., Milpitas, CA (US)

(72) Inventors: Rafit Izhak-Ratzin, Los Gatos, CA (US); Krishna Satyasai Yeddanapudi, Pleasanton, CA (US); Haim Helman, Los Gatos, CA (US)

(73) Assignee: Robin Systems, Inc., San Jose, CA (US)

( * ) Notice: Subject to any disclaimer, the term of this patent is extended or adjusted under 35 U.S.C. 154(b) by 255 days.

(21) Appl. No.: 14/454,674

(22) Filed: Aug. 7, 2014

(65) Prior Publication Data

US 2015/0074264 A1 Mar. 12, 2015

Related U.S. Application Data

(63) Continuation-in-part of application No. 14/222,370, filed on Mar. 21, 2014.

(60) Provisional application No. 61/876,045, filed on Sep. 10, 2013.

(51) Int. Cl.
*G06F 15/173* (2006.01)
*G06F 17/30* (2006.01)
*H04L 12/26* (2006.01)

(52) U.S. Cl.
CPC ...... *G06F 17/30194* (2013.01); *H04L 43/026* (2013.01); *H04L 43/045* (2013.01); *Y02B 60/33* (2013.01)

(58) Field of Classification Search
CPC . H04L 12/2602; H04Q 11/0005; G06F 8/456; G06F 9/5027; G06F 11/3612; G06F 11/3414; G06F 13/4027
See application file for complete search history.

(56) References Cited

U.S. PATENT DOCUMENTS

| 9,204,207 B2 * | 12/2015 | deRuijter | H04Q 3/0083 |
| 2012/0226804 A1 * | 9/2012 | Raja | H04L 43/028 709/224 |
| 2013/0007261 A1 * | 1/2013 | Dutta | G06F 11/3006 709/224 |
| 2013/0170451 A1 * | 7/2013 | Krause | H04L 69/14 370/329 |

(Continued)

*Primary Examiner* — Umar Cheema
*Assistant Examiner* — Ahn Nguyen
(74) *Attorney, Agent, or Firm* — David R. Stevens; Stevens Law Group

(57) ABSTRACT

Systems and methods are disclosed for generating traffic statistics for a datacenter. Distributed, parallel processing may be used to generate traffic statistics from data sets about traffic in a datacenter. To reduce data sets from which such statistics are derived to manageable sizes and relevant processing times for distributed, parallel processing, traffic agents may be provided at end hosts in the datacenter. The traffic agents may summarize data traffic over large numbers of packets in terms of the various sockets over which they are transmitted. Reports on the various sockets may be sent by the various flow agents that monitor them to an analytic controller. The analytic controller may aggregate, provide flow-path information for, further reduce, and/or provision the resultant data for distributed parallel processing.

13 Claims, 8 Drawing Sheets

(56) References Cited

U.S. PATENT DOCUMENTS

2014/0047261 A1* 2/2014 Patiejunas ............... G06F 1/266
                                                                713/330
2014/0236972 A1* 8/2014 William ............ G06F 17/30917
                                                                707/755

* cited by examiner

TRAFFIC STATISTIC GENERATION FOR DATACENTERS

RELATED APPLICATIONS

This application claims the priority benefit of U.S. Provisional Application Ser. No. 61/876,045, filed Sep. 10, 2013, the disclosure of which is incorporated by reference herein in its entirety. This application also is a continuation-in-part of U.S. application Ser. No. 14/222,370, filed Mar. 21, 2014, the disclosure of which is incorporated by reference herein in its entirety.

FIELD OF THE INVENTION

This invention relates to networking and, more particularly, generating statistics about traffic within datacenter networks.

BACKGROUND OF THE INVENTION

Datacenters can be called upon to provide many different distributed-processing and/or storage services that tend to involve increasing amounts of data and traffic on networks maintained within those datacenters. Providing adequate resources within the datacenter to accommodate this traffic is expensive. Allocation of these expensive resources is further complicated by difficulties in determining what is going on with datacenter traffic. Consequently expensive resources may be allocated inefficiently and/or traffic impediments may remain unaddressed, or addressed in suboptimal ways.

Improvements to the design and/or operation of datacenters are issues with respect to many datacenter implementations. To optimize such improvements for a given datacenter, statistical information about the given datacenter can be helpful. However, providing this statistical information proves difficult when considering the numbers of links, nodes, and amount of traffic involved, especially within the constraints imposed by datacenters themselves.

BRIEF DESCRIPTION OF THE DRAWINGS

In order that the advantages of the disclosures will be readily understood, a more particular description will be rendered by reference to specific embodiments illustrated in the appended drawings. Understanding that these drawings depict only typical examples of the and are not, therefore, to be considered limiting in scope, the invention will be described and explained with additional specificity and detail through use of the accompanying drawings, in which.

DETAILED DESCRIPTION

It will be readily understood that the components of the present invention, as generally described and illustrated in the figures herein, can be arranged and designed in a wide variety of different configurations. Thus, the following more detailed description, as represented in the figures, is not intended to be limiting in the scope, as claimed, but is merely representative of certain examples. The presently described examples will be best understood by reference to the drawings, wherein like parts are designated by like numerals throughout.

Datacenters can be highly complex, with large amounts of traffic pathways carrying varying amounts data across large numbers of nodes interwoven by increasing numbers of links of differing types. Generation of statistics about traffic flows, therefore, can entail collecting and processing a data set of significant size. To process data sets of such size, the data may be divided and distributed among several different computing nodes for parallel processing, as described in the following figure.

Figure 1:
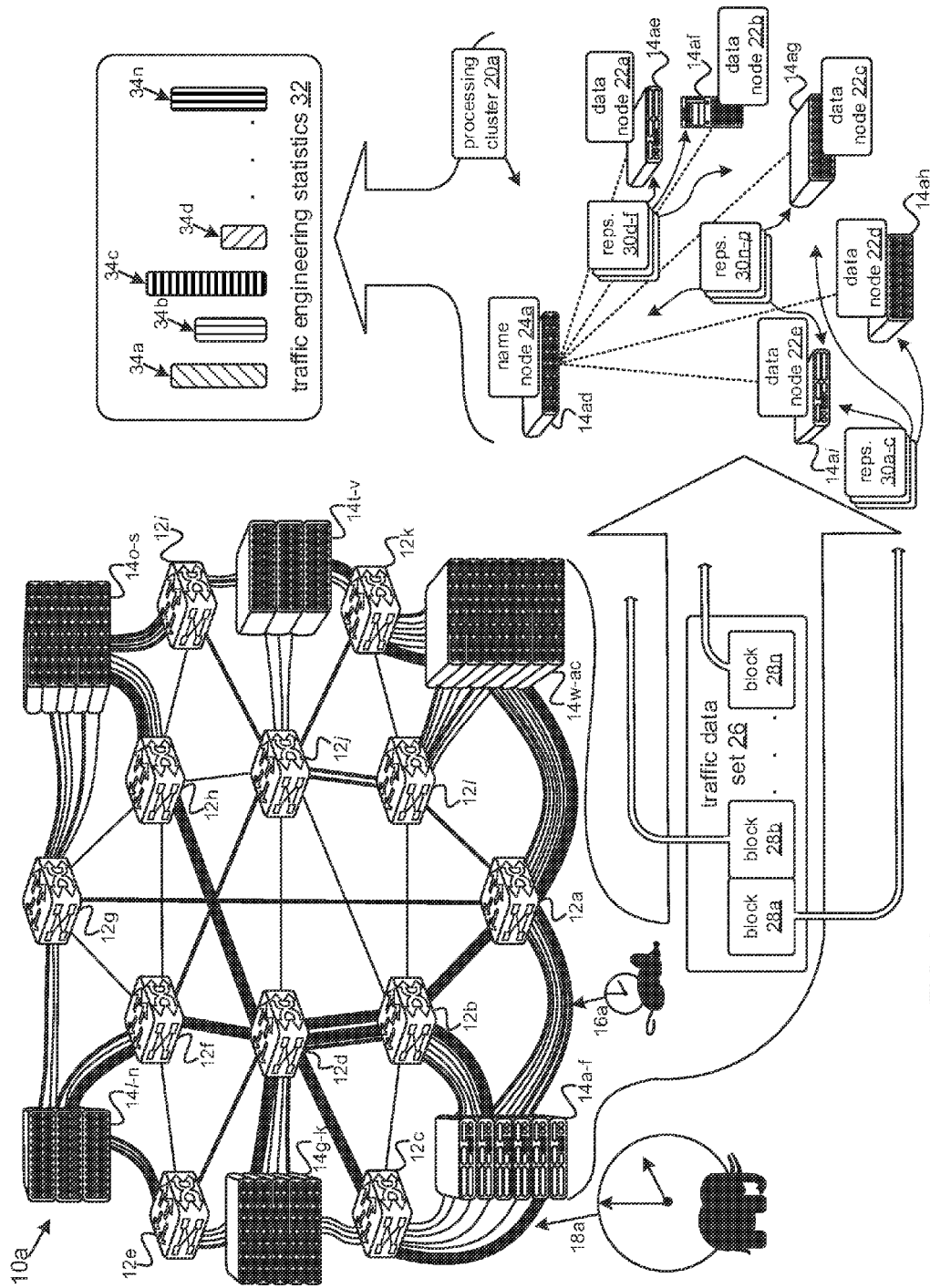
FIG. 1 is a schematic block diagram of a datacenter from which traffic data may be collected for distributed, parallel processing to produce traffic statistics specific to the datacenter, in accordance with examples.

Referring to FIG. 1, the collection of data about traffic in a datacenter 10a, or portion thereof, is depicted. The datacenter 10a may be deployed with one or more switches, routers, hubs and/or the like 12a-l. These intermediate network devices 12a-l may be communicatively connected variously one to another, as depicted. As can be appreciated, the topography depicted in FIG. 1 is non-limiting. One or more end hosts 14a-ac, which may include memory, one or more processors and/or Network Interface Controllers (NICs), may be communicatively connected to the datacenter 10a.

Interconnections between end hosts 14a-ac, as provided by the datacenter 10a, may enable traffic between end hosts 14a-ac involved in fulfilling the services provided by a datacenter 10a. The datacenter 10a, intermediate nodes 12a-l, and end hosts 14a-ac may be configured to transmit data by packet switching. Where the datacenter 10a implements a connection based approach to packet switching, the overall traffic in the datacenter 10a may be understood as the aggregate of individual traffic flows. A traffic flow is a series of interrelated frames, and/or packets, sent from a common source to a common destination in the datacenter 10a.

In terms of traffic flows, many datacenters 10a utilizing connection based packet switching experience the distinctive characteristics of "big-data" traffic. In "big-data" traffic, most traffic flows are short in duration and/or bursty and are often referred to, because of their relatively small times and/or the relatively small amounts of data being transferred as "mice flows," 16, indicated in FIG. 1 as thick black lines. These thick black lines, however, are considerably less thick than those depicting the other traffic flows 18, often referred to as "elephant flows" 18. Elephant flows 18 may transfer larger amounts of information over longer periods of time. Most of the traffic in a datacenter 10a may be transferred in such elephant flows 18.

Certain paths in the datacenter 10a may tend to carry more elephant flows 18, while other paths may tend to carry less. As can be appreciated, due to the extended amount of time during which an elephant flow 18 occupies a path and/or because of the relatively amount of data transferred during such a flow, greater demands may be placed on such paths. Some paths may tend to carry more mice flows 16, while other paths may tend to carry less. Similarly, certain paths may tend to carry larger amounts of data overall due to different combinations of traffic flows 16, 18, while others tend to carry less.

Also, demands on network elements may be increased where segments of one or more paths combine in the network. The number of paths, and the number of segments of those paths at which different paths intertwine introduce significant complexity into traffic predictions. Statistical analysis of a data set tracking transmissions in a datacenter 10 may provide patterns capable of answering such questions. However, a data set tracking transmissions with an appropriate level of granularity to reflect such relevant complexities across time can be enormous.

A cluster 20a of computing nodes 14ad-ai can provide infrastructure for distributed, parallel processing to engage such a large data set 26, tracking datacenter transmissions. Throughout this application, a computing node may refer to a physical computing node or a virtual computing node/instance. To facilitate distributed processing, the cluster 20a may be operable to implement a Distributed File System (DFS). The DFS may be implemented in software, firmware, hardware, and/or the like as modules at various physical computing nodes 14ad-ai within the cluster 12.

By way of providing an example of a DFS, and not by way of limitation, in some examples, the DFS may be consistent with a MapReduce approach to parallel processing. For example, the DFS may be an instance of GOOGLE File System (GFS) or HADOOP Distributed File System (HDFS). In such examples, data nodes 22a-22e and a name node 24a may be established at the various computing nodes 14ad-ai. However, as can be appreciated, other DFSs are possible.

In accordance with the DFS, a large data file, or data set, 26 which tracks transmissions, may be split into multiple blocks 28a-28n (also referred to as data blocks) for storage among multiple data nodes 22a-e. To provide redundancy, in case a data node 22 on which a given block 28 is stored fails and/or to provide greater access to the blocks 28, replicas 30a-c, 30d-f, 30n-p of blocks 28a, 28b, 28n may be produced. The name node 24 may fill a role as a master server in a master/slave architecture with data nodes 22a-e filling slave roles. Since the name node 24 may manage the namespace for the DFS, the name node 24 may provide awareness, or location information, for the various locations at which the various blocks/replicas 28/30 are stored. Furthermore, the name node 24 may determine the mapping of blocks/replicas 28/30 to data nodes 20. Also, under the direction of the name node 24, the data nodes 22 may perform block creation, deletion, and replication functions.

The computing nodes 14ad-ai in the cluster 20a may be provided with modules implementing a coordinated, parallel processing engine. Some non-limiting examples of the engine may be consistent with a MapReduce engine, such as, without limitation, HADOOP. However, as can be appreciated, other forms of distributed, parallel processing are consistent with the teachings herein.

The cluster 20a may implement one or more data mining, statistical, and/or other techniques during the distributed, parallel processing. As a result, the cluster 20a may produce, discover, generate, create, and/or uncover traffic statistics 32 for the datacenter 10a, or portion thereof. The resultant traffic statistics 32 may provide values for one or more statistical metrics 34a-n. Such values for one or more of the statistical metrics 34a-n may be useful for purposes of traffic engineering, efficiently allocating network resources, and/or generally improving the datacenter 10a.

Often the very datacenter 10 for which traffic statistics 32 are being generated may also provide the cluster 20, portions thereof, and/or resources used to process the data set 26 tracking data transmissions within the datacenter. The usefulness of the resultant statistics, therefore, can be significantly reduced where datacenter resources are occupied with the processing of such statistics. The negative impact on a datacenter's primary activities may increase the longer such resources in the datacenter are occupied.

Therefore, the size of the data set 26 provided for processing can have significant implications. This can be true whether the data set 26 is processed within the datacenter 10 or not. For example, due to the dynamic nature of traffic patterns within a datacenter 10, traffic statistics 32 that require overmuch processing time may be of little use. Regardless, to acquire traffic statistics 32, valuable computing and networking resources, irrespective of where they reside, are occupied. Managing the size of the data set 26 such resources are called upon to process can enable management of the demands placed on such resources and/or their impact on the corresponding datacenter 10. Management of the data set 26 can be a function of the kinds of data collected and/or the manner in which that data is collected. The following figure is used to explain the kinds of data commonly collected in the prior art and approaches commonly taken to collect it.

Figure 2:
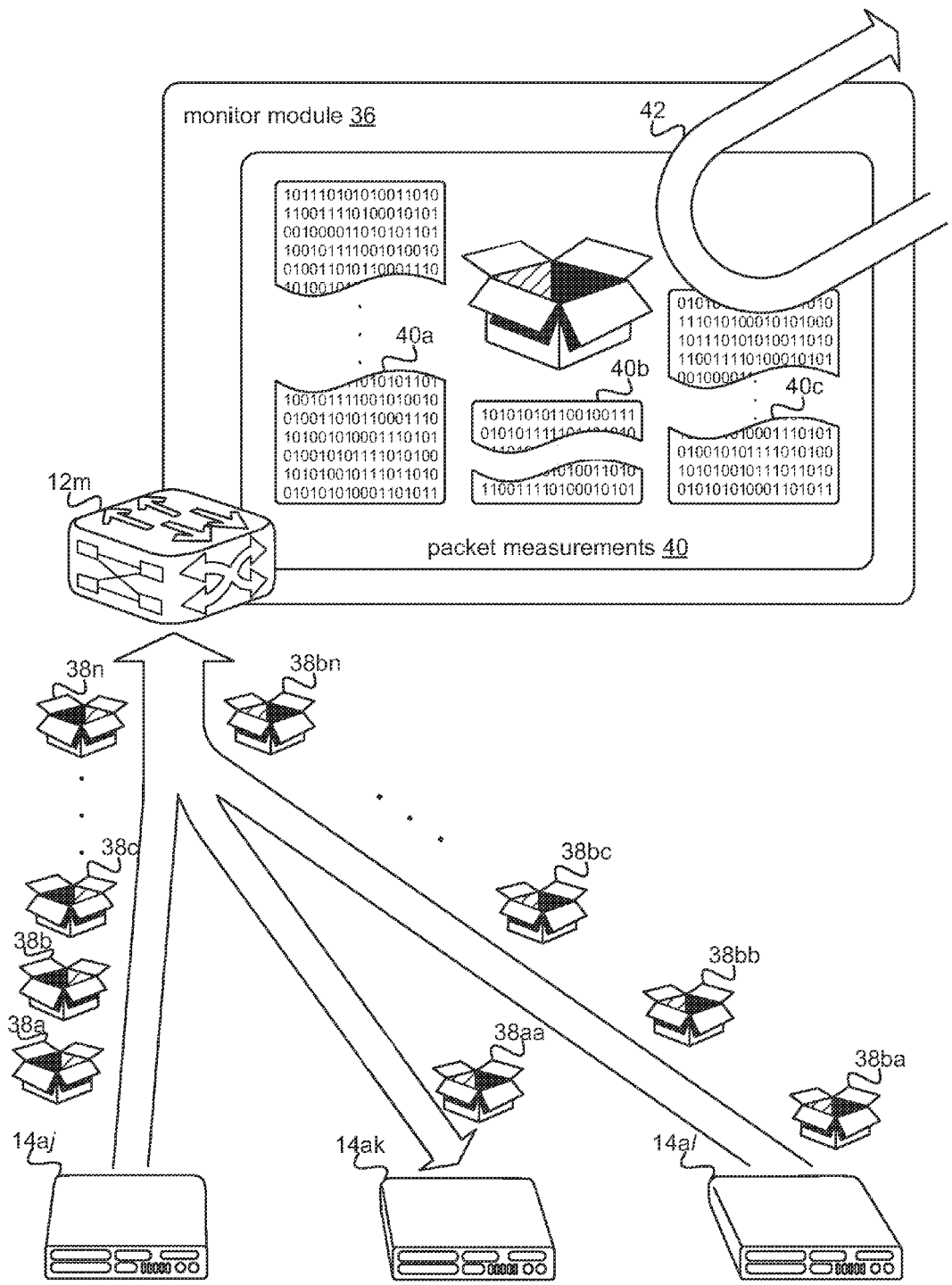
FIG. 2 is a schematic block diagram of the polling of a switch/router, or other intermediate node in a network for traffic data collected at a packet-level of granularity, in accordance with prior art.

Referring to FIG. 2, the referencing of an intermediate node 12m in a network for traffic data, being collected at a packet-level of granularity, is depicted. In the prior art, data on transmissions from and/or to multiple different end hosts 14aj-al is commonly collected by a monitoring module 36 at an intermediate node 12m within the corresponding network. Such intermediate nodes 12m may be a switch, a router, a hub, or the like and/or a load balancing server, a mirror server, or the like.

The monitoring module 36 can collect data on transmissions to and/or from the end hosts 14aj-al by inspecting packets 38a-n, 38aa, 38ba-bn and/or packet headers for information. Such information may include information about a source of a packet 38 and/or a destination of a packet 38. Furthermore, the monitoring module 36 can collect information about the length, or size of a packet 38. Additional categories of information may also be collected. Therefore, the monitoring module 36 collects and/or stores data transmission information as packet measurements 40 at a packet level of granularity.

In some cases, packet measurements 40 can be sorted, or stored, in groups 40a-c by the sources and/or destinations from and/or to which the packets 38 are sent. Depending on the rate at which data is transmitted, more or less information may be stored in these groups 40a-c, corresponding to individual numbers of packets 38 transmitted. For example, in FIG. 2, the end host 14aj in the lower, left corner transmits packets 38a-n at a higher rate than the end host 14al in the lower, right corner transmits the packets 38ba-bn that it sends, as reflected in the sizes of their corresponding packet measurements 40a, 40c respectively. Similarly, the group of packet measurements 40b corresponding to packets 38a destined for the central end host 14ak is the smallest, recording only a single packet 38aa.

The intermediate node 12m and/or the monitoring module 36 may then be polled 42, together with additional nodes/monitoring modules 12/36, to collect the data set 26 tracking data transmissions across the datacenter 10. As can be appreciated, when data is collected and/or aggregated for each packet 38, or at the packet level, the resultant data set 26 can be enormous. Consequently, such data sets 26 are problematic for generating practical, useful, and/or relevant traffic statistics 32.

In many prior-art datacenters 10, packet switching may be implemented as connectionless packet switching, or as a datagram network. In connectionless packet switching, determinations are made at individual nodes 12 about the path an individual packet 38 will describe through a datacenter 10. Such approaches can foster utilization of available links and capacity and/or provide redundancy and/or resilience within a datacenter 10. Packets 38 from the same source end host 14 to a common destination end host 14, therefore, may describe different paths, including packets 38 from a common message or file. In cases where path determinations are made for individual packets 38 at individual intermediate nodes 12, a complete characterization of datacenter traffic can involve packet-level collections at individual intermediate nodes 12 and comprehensive polling 42 of those nodes 12.

Attempts to reduce the potentially enormous size of the resultant data set 26 are complicated by the potential variability of individual packets 38. Additionally, polling 42 of intermediate nodes 12, as opposed to the end hosts 14 from which such packets 38 originate inherently introduces delays. Furthermore, such approaches require monitoring capabilities almost uniformly across the intermediate nodes 12 of a datacenter 10, capabilities that are expensive and not present on all potential equipment.

To address problems and obstacles such as those discussed above, several innovations are disclosed herein, a brief overview of which is set forth here. Problems may be addressed by implementing a form of connection-based packet switching. In such examples, a connection may be established between a source end-host 14 and a destination end-host 14 that describes a common path of edges/links and/or vertices/nodes traversed by packets 38 through the datacenter 10 from the source 14 to the destination during a traffic flow.

In some examples, a single physical path may exist for a given traffic flow from a common source to a common destination irrespective of the traffic flow. In such examples, a fixed path, described by a series of physical edges/links and verticies/nodes, may describe a traffic flow 16/18. In some examples, a path for a traffic flow 16/18 may also be a virtual path in terms of a logical overlay, allowing for multiple different physical paths within a single virtual path described by a fixed series of logical edges and vertices.

Therefore, a traffic flow may be described by a unique combination, such as, without limitation, a unique tuple, such as, by way of a non-limiting example, the four tuple: <source IP, destination IP, source port, destination port>. In certain examples, this information may be provided by values for socket parameters used to transmit the traffic flow 16/18.

In datacenters 10 where packet switching is implemented based on such connections, data on transmissions may be collected at the traffic-flow level, greatly reducing the size of any resultant data set 26 tracking transmissions. A system for generating traffic statistics 32 for a datacenter 10, in such an environment, may include, for example, one or more flow agents at one or more end-host computers 14 in the datacenter 10. The flow agent(s) may be operable to summarize traffic data at a level of a portion of a traffic flow or an entire traffic flow and/or a grouping of multiple traffic flows and/or one or more portions thereof.

In as much as a process running at an end host 14 may initiate multiple traffic flows with differing destinations, grouping traffic flows and/or portions thereof based on the process initiating them may be problematic. However, since a traffic flow is a series of interrelated frames, and/or packets, sent from a common source to a common destination, the common source and destination recordable in a tuple, the traffic agent(s) may summarize traffic from one or more traffic flows, and/or one or more portions thereof, in a tuple-traffic group, where the traffic flows share a common, descriptive tuple. In such examples, summarizing traffic data at the level of a tuple-traffic group, the tuple-traffic group can include multiple traffic flows, or portions thereof, between a common source and a common destination over a given period of time.

In a connection-based approach to packet switching, the packets 38 pertaining to a common tuple-traffic group traverse the same path of edges and nodes from their source to their destination. Therefore, the path traversed by packets 38 pertaining to a traffic flow, or portion thereof, can be identified by bundling the traffic data for the traffic flow, or traffic-flow portion, with source and destination information. Therefore, in some examples, a flow agent may bundle the traffic data with source information, such as, without limitation, socket information, for the traffic flow. Additionally, the flow agent may report the traffic data, with source information, to an analytic controller.

The analytic controller may be hosted by a computer 14 in the datacenter 10 comprising memory, a processor, and an NIC. The analytic controller may reside on the same computer 14 as the flow agent discussed above, another flow agent, or on a computer 14 without a flow agent. The analytic controller may be operable to aggregate traffic data, with bundled source information, from multiple flow agents hosted by multiple end hosts 14 in the datacenter 10 for which traffic statistics 32 are sought. Furthermore, the analytic controller may be operable to provision aggregated traffic data for traffic-statistic-producing parallel processing. In some examples, the analytic controller may engage in pre-processing of the aggregated traffic data 26 in ways, such as further reducing the size of the data set 26 and/or providing path information, discussed with respect to the figures described below.

Systems consistent with such examples may further include a cluster 20 of computing nodes 14. The cluster of computing nodes 14 may be provided with a DFS. The DFS may be used for aggregated traffic data and/or a resultant data set 26. Hence, the aggregated traffic and/or data set 26, or blocks/replicas 28/30 derived therefrom, may be assigned across multiple different computing nodes 14 in the cluster 20 for parallel processing.

The cluster 20 may also implement a processing engine operable to generate traffic statistics 32 for the datacenter 10 during parallel processing of the aggregated traffic data and/or data set 26 at different computing nodes 14 across the cluster 20. Depending on the example, the cluster 20 of computing nodes 14 may include a set of computing nodes 14 within the datacenter 10 for which traffic statistics 32 are sought. In some examples, the entire cluster 20 may reside in the datacenter 10.

Figure 3:
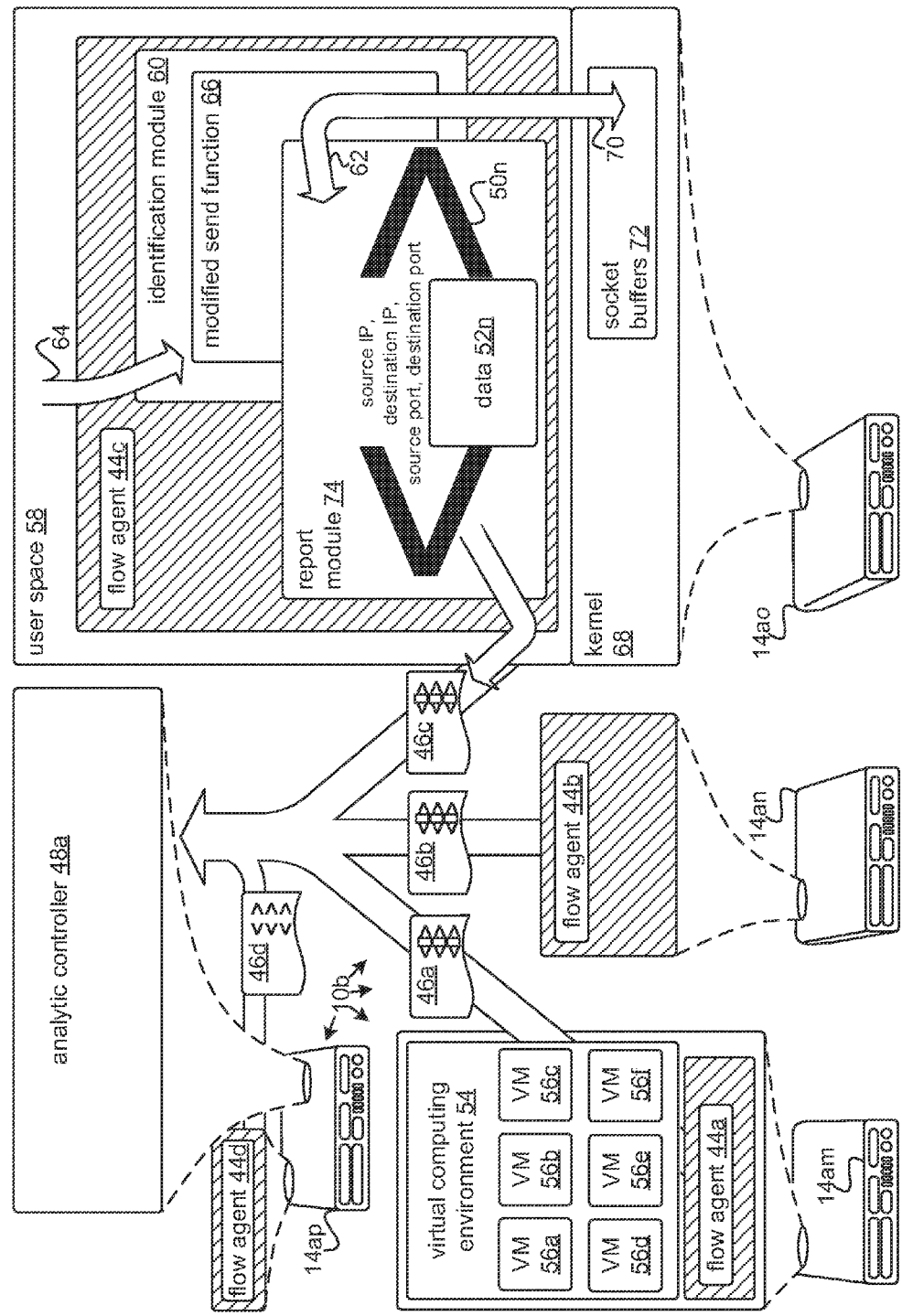
FIG. 3 is a schematic block diagram of flow agents deployed at multiple end-hosts within a datacenter to provide traffic reports to an analytic controller, also hosted within the datacenter, in accordance with examples.

Referring to FIG. 3, exemplary flow agents 44a-d are depicted. The flow agents 44a-d are deployed at multiple end hosts 14am-ap in a datacenter 10b. The flow agents 44a-d may be operable to provide, provision, send and/or communicate reports, messages, logs, and/or files 46a-d reporting on traffic sent from the end hosts 14am-ap at which they reside to an analytic controller 48a, also residing on an end host 14ap in a datacenter 10b. Although the analytic controller 48a is depicted as residing at an end host 14ap with a flow agent 44d in the datacenter 10, consistent with many examples, in some examples, the analytic controller 48b may reside on hardware that does not also host a flow agent 44d and/or does not pertain to the datacenter. Traffic may be sent from a common end host 14, as can be appreciated, as part of multiple different traffic flows/tuple-traffic groups.

In some examples, the flow agents 44a-d may report traffic data classified in terms of traffic flow(s) and/or tuple-traffic group(s) to which they pertain, as indicated by the multiple carrot symbol pairs, '< >'. The carrot symbol pairs, '< >', represent a set of identification information 50n, which may include values for traffic-flow/traffic-tuple-group parameters. The four-tuple discussed above provides one non-limiting example for the structure of such a set of identification/source information 50n. The sets of identification/source information 50n may be used to identify traffic-flow/traffic-tuple-group data 52n with a corresponding traffic flow/tuple-traffic group in the report 46c. In some examples, this information 50n may be made up of socket information, such as values for parameters used to identify a socket, and/or some other form of source information 50n.

As depicted with respect to the first end-host 14am, in some examples, one or more end hosts 14 in a datacenter 10 may support a virtual computing environment 54 with one or more virtual computing instances 56a-f, which may or may not be implemented as one or more Virtual Machines (VMs) 56a-f. Furthermore, a virtual computing environment 54 may include one or more virtual switch and/or may support a virtual cluster/group 20 of virtual computing nodes 56. The virtual computing environment 54 may include a hypervisor, or, in other examples, may be provided without a hypervisor, such as in an Operating-System (OS)-virtualization environment. In such examples, a single flow agent 44a may be deployed at the corresponding end host 14am to collect traffic information/data on data transmitted from multiple virtual computing instances 56a-f supported by the end host 14am. The flow agent 44a may also be operable to collate the traffic data to identification/source information for the multiple virtual computing instances 56a-f transmitting the traffic data.

Non-limiting examples of potential details, provided by way of example, for the collection of traffic data 52n by a flow agent 44 are depicted within the expanded view of flow agent 44c, together with aspects of the infrastructure of end host 14ao. In such examples, the flow agent 44c may reside within user space 58 at the end host 14ao, and the flow agent 44c may be provided with an identification module 60.

The identification module 60 may be operable to provide 62 data metric information 52n, or traffic data 52n, and to copy identification/source/socket information 50n from a send call 64. The send call 64 may originate within an application, process, and/or the like within user space 58 at the end host 14ao. The application, process, and/or the like may issue the send call 64 to transmit data within the datacenter 10b over a socket at the end host 14ao.

In some examples, the identification module 60 may include a modified send function 66. The modified send function 66 may be operable to emulate a system call, such as a send system call, supported by a System Call Interface provided by a kernel 68 at the end host 14ao. Additionally, the modified send function 66 may provide a modification with respect to other send functions inasmuch as it may copy 62 source information 50n and/or generate 62 traffic data 52, from the send call 64 in the process of provisioning 70 the data to be sent to a socket buffer 72. With respect to additional details and/or different approaches to the use of a flow agent 44 to collect source information 50 and traffic data 52, the reader is referred to U.S. Utility patent application Ser. No. 14/222,370, filed on Mar. 3, 2014 and incorporated herein by reference.

A report module 74a may be operable to prepare and/or send one or more reports 46c to the analytic controller 48a. In some examples, the report module 74a may be operable to generate a report 46c including a pre-activity file with the combined traffic data 52 and corresponding identification/source/socket information 50 for communication to the analytic controller 48a. The pre-activity file may include identification information 50 and traffic data 52 for multiple different traffic flows 16/18, tuple-traffic groups, sockets, and/or the like. Information provided in such a report 46c may be referred to as a pre-activity file because such a file contains raw information provided from a flow agent 44 before the analytic controller 48a has engaged in activity on the pre-activity file.

As can be appreciated, much of the structure and functionalities discussed with respect to flow agents 44 residing throughout datacenters 10 may be provided by modules. Throughout this application, the structure and/or functionalities discussed herein may be described and/or handled by modules. Modules may take the form of an entirely hardware embodiment, an entirely software embodiment (including firmware, resident software, micro-code, etc.), or an embodiment combining software and hardware aspects. Furthermore, aspects of the presently discussed subject matter may take the form of a computer program product embodied in any tangible medium of expression having computer-usable program code.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as C++, and conventional procedural programming languages, such as the "C" programming language, or similar programming languages. Aspects of a module that are implemented with software may be executed on a micro-processor, Central Processing Unit (CPU) and/or the like. Any hardware aspects of the module may be implemented to interact with software aspects. Additional details with respect to report modules 74 consistent with the disclosures herein are discussed with respect to the following figure.

Figure 4:
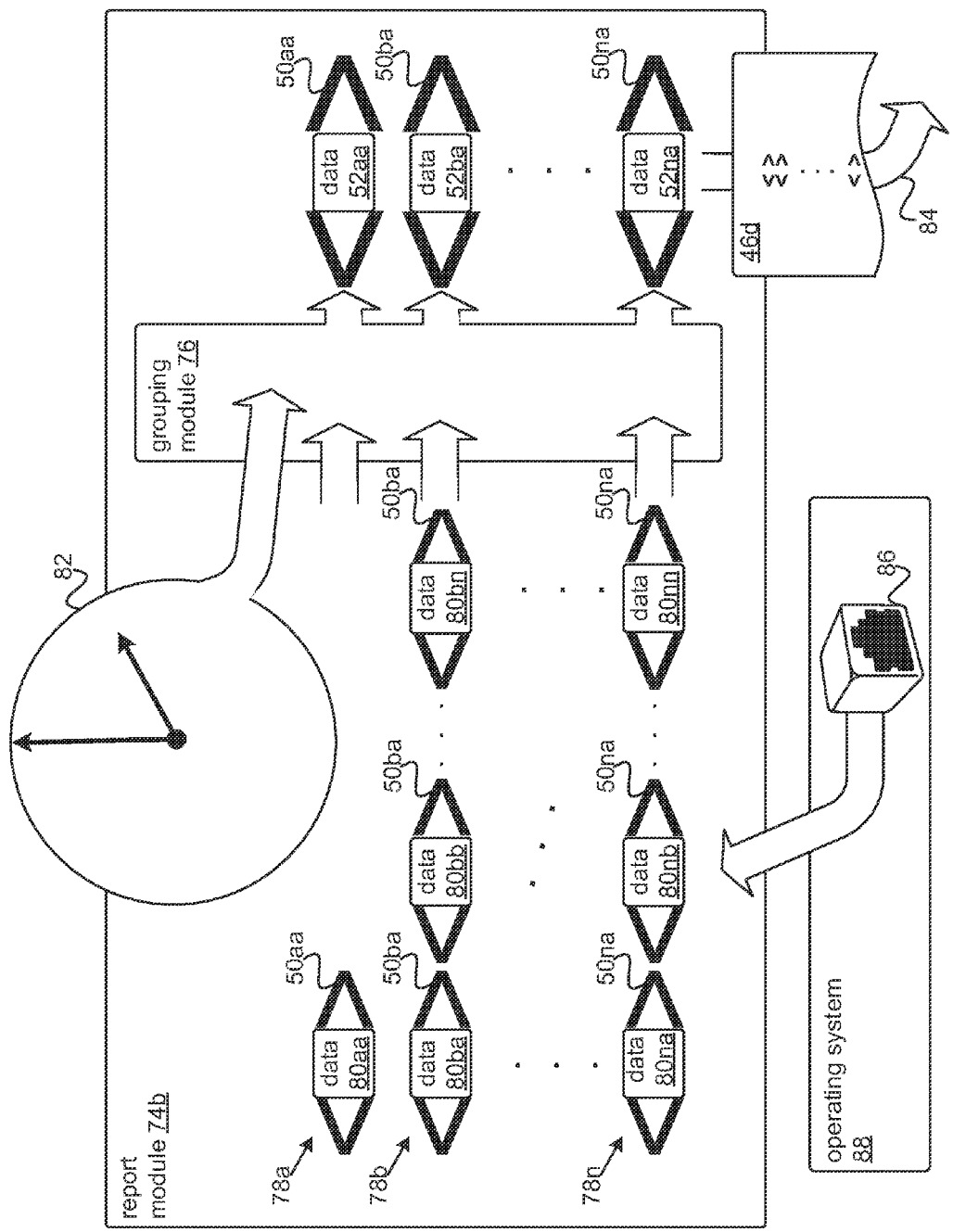
FIG. 4 is a schematic block diagram of the grouping of traffic data from one or more traffic flows and/or one or more portions thereof for grouped units of flow data, in accordance with examples.

Referring to FIG. 4, a report module 74b residing at a flow agent 44 is depicted. As discussed above, the reporting module 74b may be operable to send reports 46 on traffic sent from a corresponding end host 14 to an analytic controller 48 to support the generation of traffic statistics 32. However, frequent reports 46 may combine to contribute in a significant way to the traffic load on a datacenter 10. Since reducing traffic congestion and associated problems can be one of the motivations for generating traffic statistics 32, the contribution to traffic load made by the collection of data to generate such statistics can be a significant concern.

To address this and other related issues, a grouping module 76, which may or may not reside within the report module 74b, is depicted. The grouping module 76 may be operable to combine and/or summarize traffic data 52 for multiple traffic flows with a common source and destination into common tuple-traffic groups 78a-n. In such examples, a tuple-traffic group 78 may be describable by common parameter values for the common source and destination within the source information used to transmit traffic flows belonging to the common tuple-traffic group 78.

For certain examples, the grouping module 76 may accomplish this summary of traffic data by combining traffic-flow summaries 80ba-bn, 80ca-cn from multiple traffic flows and/or one or more portions of traffic flows pertaining to a common tuple-traffic group 78b, 78c. Grouped summaries 52aa, 52ba, 52na of traffic-flow summaries 80ba-bn, 80na-nn may share common identification information 50ba, 50na, or may share certain categories of identification information for corresponding common tuple-traffic groups 78b, 78c.

For example, the grouping module 76 may generate combined traffic data 52ba summarizing the traffic scheduled for a common tuple-traffic group 78b by combining traffic-flow data 80 for multiple traffic flows, or portions thereof, summarizing traffic scheduled for a common tuple-traffic group 78b within the grouping time period 82. The combined traffic data 52ba, for example, may include traffic-flow data 80ba summarizing a first portion of a first traffic flow and traffic-flow data 80bb summarizing a second portion of a second traffic flow along a common tuple-traffic group 78b, together with identification information 50ba, identifying the tuple-traffic group 78b. Throughout this application, a portion of a traffic flow may include the entire traffic flow, or less than the entire traffic flow. For some tuple-traffic groups 78, the grouping module 54 and/or reporting module 74 may utilize a traffic-flow summary 80aa from a single traffic flow, or portion thereof, for the traffic data 52aa.

In other words, in some examples, the grouping module 76 may summarize traffic flows within a grouping time period 82. The grouping module 76 may group all traffic-flow summaries 80 pertaining to traffic flows, or portions thereof, within the grouping time period 82, combining such traffic-flow data 80 to produce a grouped unit of traffic data 52, together with identification information 50 for a common tuple-traffic group 78 for communication 84 to the analytic controller 48. For certain examples, all data scheduled for a given traffic flow/tuple-traffic group 78, whether sent or not, during the grouping period 82 may be summarized by the grouping module 76. The grouping module 76 and/or the report module 74 may be communicatively coupled to a counter, indicating when a grouping time period 82 has expired, in order to impose the grouping time period 82.

The duration of a grouping period 82 may be determined by multiple considerations. For example, increasing the time may decrease the amount of traffic involved in a datacenter 10 devoted to acquiring statistics about the datacenter 10. Conversely, if the grouping period 82 is too large, flexibility in gathering statistics is sacrificed. By way of providing at least one example, and not by way of limitation, a grouping period 82 of three seconds may be chosen. However, as can be appreciated, any number of times may be considered for a grouping period 82, to tailor the grouping period 82 to particular datacenters 10.

As the number of common tuple-traffic groups 78 sent from an end host 14 may be dynamic, a flow agent 44, or report module 74, may add a new flow to a tuple-traffic group 78 when appropriate, i.e., when the new flow shares common parameters with the tuple-traffic group. For example, the flow agent 44, and/or report module 74, may add the new flow when a new socket 86, which may be used to describe the new traffic tuple-traffic group 78, is created and/or provided by the end host's operating system 88. As with the other common flows 78, the flow agent 44 and/or report module 74 may monitor traffic scheduled for transmission from the new socket 86 to collect traffic-flow data/grouped units of traffic data 80/52 summarizing data transmitted over the new socket 86.

Where a new flow created by a new socket 86 is a long-lived traffic flow 18, the report module 74b will report on the new, long-lived traffic flow 18. Where the new socket 86 is responsible for a short-lived traffic flow 16, the report module 74b may create a new tuple-traffic group 78n for similar short-lived traffic flows 16 from a common source and destination, where an existing tuple-traffic group 78 does not share the common source and destination. Where an existing tuple-traffic group 78 shares the common source and destination, the new short-lived traffic flow 16 may be reported with the existing tuple-traffic group 78.

In examples implementing a grouping period 82, the report module 74b can report the traffic data 52, with corresponding identification information 50, in a report 46 once the grouping period 82 has expired. As with the flow agents 44, an analytic controller 48 may be used in a system for facilitating the collection/generation of traffic statistics 32. An analytic controller 48 consistent with disclosures herein is discussed in greater detail with respect to the following figure.

In a big data traffic environment, mice flows 16, as discussed with respect to FIG. 1, can make up a significant majority of traffic flows while contributing a minority of the data transmitted by a significant amount. Conversely, elephant flows 18, as also discussed with respect to FIG. 1, can contribute a majority of the data transmitted, with significant implications for performance, while being relatively less frequent. By way of example, therefore, to reduce the number of reports 46 sent and/or general overhead, flow agents 44 may combine mice flows 16 in a common tuple-traffic group 78, where these mice flows 16 share a common source and destination.

Contrariwise, flow agents 44 may report on a single traffic flow for a relatively less frequent elephant flow 18, which may contain potentially more significant information for performance metrics and issue diagnostics. For certain examples, efficiency gains may go so far as to lead flow agents 44 to disregard mice flows 16 without reporting on them. Techniques for distinguishing between mice flows 16 and elephant flows 18 can be found in U.S. Utility patent application Ser. No. 14/222,370, filed on Mar. 3, 2014, and incorporated herein by reference.

Figure 5:
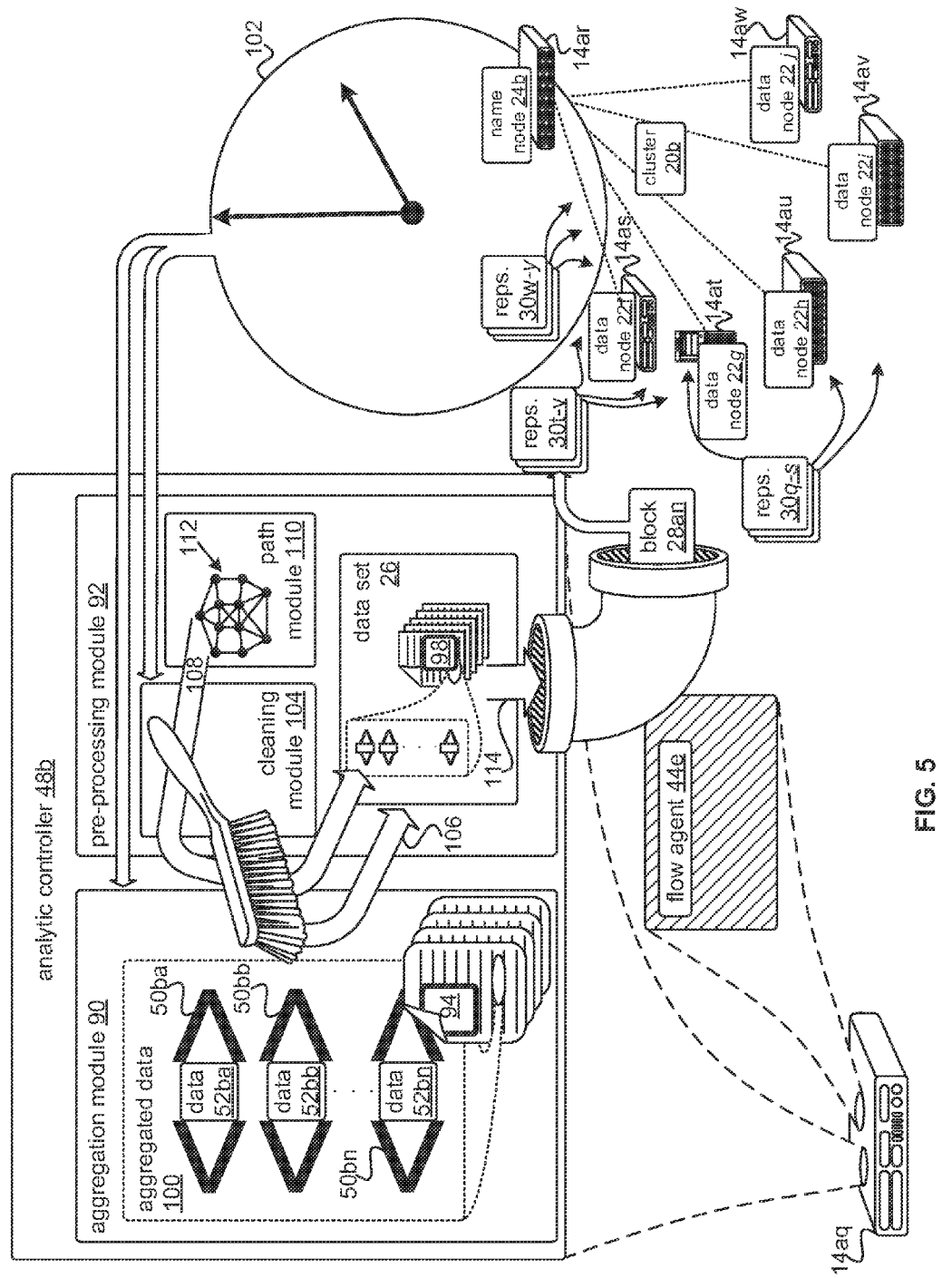
FIG. 5 is a schematic block diagram of an analytic controller, at which pre-activity files/reports from flow agents are aggregated and/or are pre-processed, for example, by a path module and/or a cleaning module to create post-activity files with path information and/or reduced data sizes manageable for processing by a cluster of computing nodes, in accordance with examples.

Referring to FIG. 5, an analytic controller 48b is depicted. The analytic controller 48b may be hosted on a computing device, such as an end host 14aq, including memory, a processor, and an NIC operable to connect to a datacenter 10 and/or flow agents 44 residing at end hosts 14 in the datacenter 10, whether or not the computing device is within the datacenter 10. In certain examples, such as the one depicted in FIG. 5, the analytic controller 48b may be hosted on an end host 14aq also hosting a flow agent 44e. To assist in the aggregation of traffic data 52 from the datacenter 10 and/or the generation of traffic statistics 32, the analytic controller 48b may include an aggregation module 90 and/or a pre-processing module 92.

Generally, a pre-processing module 92 may be operable to prepare aggregated pre-activity files 94 for distributed, parallel processing at multiple computing nodes 14ar-aw in a cluster 20b. As a result of the activities on the pre-activity files 94, the pre-processing module 92 may produce a data set 26 post-activity files 98. The pre-processing module 92 can prepare aggregated pre-activity files 94 in many ways. For example, the pre-processing module 92 may make formatting changes or otherwise engage with aggregated data 100 to prepare the aggregated data 100 for processing by the cluster 20b.

The aggregation module 90 may be operable to receive and aggregate reports 46 including pre-activity files 94 reporting on traffic scheduled for transmission at multiple sockets 86. The traffic reported on may be scheduled for transmission during at least one reporting period 82, or grouping period 82. The sockets 86 may reside at multiple end hosts 14 in a datacenter 10 and/or may pertain to one or more different virtual computing instances 56. By providing aggregated data 100, aggregated from end hosts 14 across the datacenter 10, the aggregation module 90 may provide data from which traffic patterns and/or statistics 32 for the datacenter 10 may be derived.

Also, the aggregation module 90 may aggregate reports 46 over a predetermined timeframe 102. The duration of the predetermined timeframe 102 may reflect many different considerations. For example, if the analytic controller 48b made a data set 26 available to the cluster 20b and/or the cluster 20b retrieved the data set 26 to frequently, the underlying data set 26 may not be large enough to indicate relevant traffic patterns in the resultant traffic statistics 32.

Additionally, the running of a distributed, parallel-processing job at a cluster 20b of computing nodes 14ar-aw can involve a significant amount of time to set up and to execute. By way of example, and not by way of limitation, time may be involved to break a data set 26 into blocks 28 for processing, generate replicas 30, assign blocks/replicas 28/30 to different computing nodes 14 ar-aw/56 in accordance with a DFS, coordinate processing across the cluster 20b, and/or aggregate a result. Too frequent use of the cluster 20b may result in unjustifiable overhead.

Therefore, the aggregation module 90 may aggregate reports 46 over a predetermined timeframe 102 that provides a sufficient data set 26 to detect relevant patterns and/or to appropriately utilize the cluster 20. Furthermore, to provide continuously updatable statistics, the duration of time over which the aggregation module may aggregate reports 46 may be made sufficiently long to allow the cluster to process the previous data set 26.

However, if the predetermined timeframe 102 grows too large, the aggregated data 100 may also become too large, requiring too many resources and/or too much time to process. Such concerns may have particular applicability where the cluster 20b of computing nodes 14 pertains to the datacenter 10 for which traffic statistics 32 are sought. In some examples, however, a pre-processing module 92 may assist to reduce the size of the data set 26 processed by the cluster 20b.

The pre-processing module 92 may, for example, include a cleaning module 104. The pre-processing module 92, and the analytic controller 48b and the computing device to which it pertains, may lack the resources to summarize reports 46 from flow agents 44 across the datacenter 10—the resources of the cluster 20b may be relied upon for these services. However, a cleaning module 104 may be operable to participate in the creation of post-activity files 98 by cleaning 106 aggregated traffic data 100, as aggregated by the aggregation module 90 and/or analytic controller 48b, reducing a size of the aggregated traffic data 100 to make up a smaller data set 26 for parallel processing. For this reason, in FIG. 5, the aggregated data 100, within pre-activity files 94, are depicted as being much larger than the data set 26 of post-activity files 98 for processing by the cluster 20b.

The size of the smaller data set 26 may be reduced to a size such that the smaller data set 26 can be processed by the cluster 20b with available resources in the cluster 20b and within the predetermined timeframe 102. In some examples, the cleaning module 104 may reduce the size of the aggregated data 104 in the pre-activity files 94 for parallel processing by removing 106, or cleaning 106, one or more predetermined categories of data from pre-activity files 94/aggregated traffic data 100, allowing for more expedited parallel processing at the cluster 20b. In such examples, the cleaning module 94 may be operable to remove categories of data not required for data mining performed by the cluster 20b of computing nodes 14ar-aw.

Additionally, or in the alternative, the pre-processing module 92 may provide 108 information to the aggregated data 100 that may prove useful to the generation of traffic statistics 32. For example, the analytic controller 48b and/or the pre-processing module 92 may include a path module 110. Such a path module 110 may be operable to maintain topology information 112 for the datacenter 10.

Additionally, the path module 110 may be operable to apply the topology information 112 to identification/source/socket information 50ba-bn bundled with the traffic data 52ba-bn summarizing a portion of a traffic flow/tuple-traffic group to generate path information for the portion of the traffic flow transmitted through the datacenter 10. Such path information may include a list of one/or more edge and/or two or more nodes 12/14/56 traversed by traffic during the portion of the traffic flow/group of tuple-traffic. The path module 110 may also be operable to include 108 the path information with the aggregated traffic data 100 and/or the data set 26 provisioned 114 for parallel processing.

Once the pre-processing module 92 has prepared the data set 26, the analytic controller 48b and/or some module therein may be operable to pipe, assign, make available, or otherwise provision 114 the post-activity files 98, data set 26 and/or blocks/replicas 28/30 to the cluster 20b, and/or a DFS provided by the cluster 20b, for processing. By the time the data set 26 has been provisioned 114 for processing, one or more techniques may have been implemented to assist in reducing resources and/or time involved in processing the data set 26. Examples of such techniques are summarized with respect to the following figure.

Figure 6:
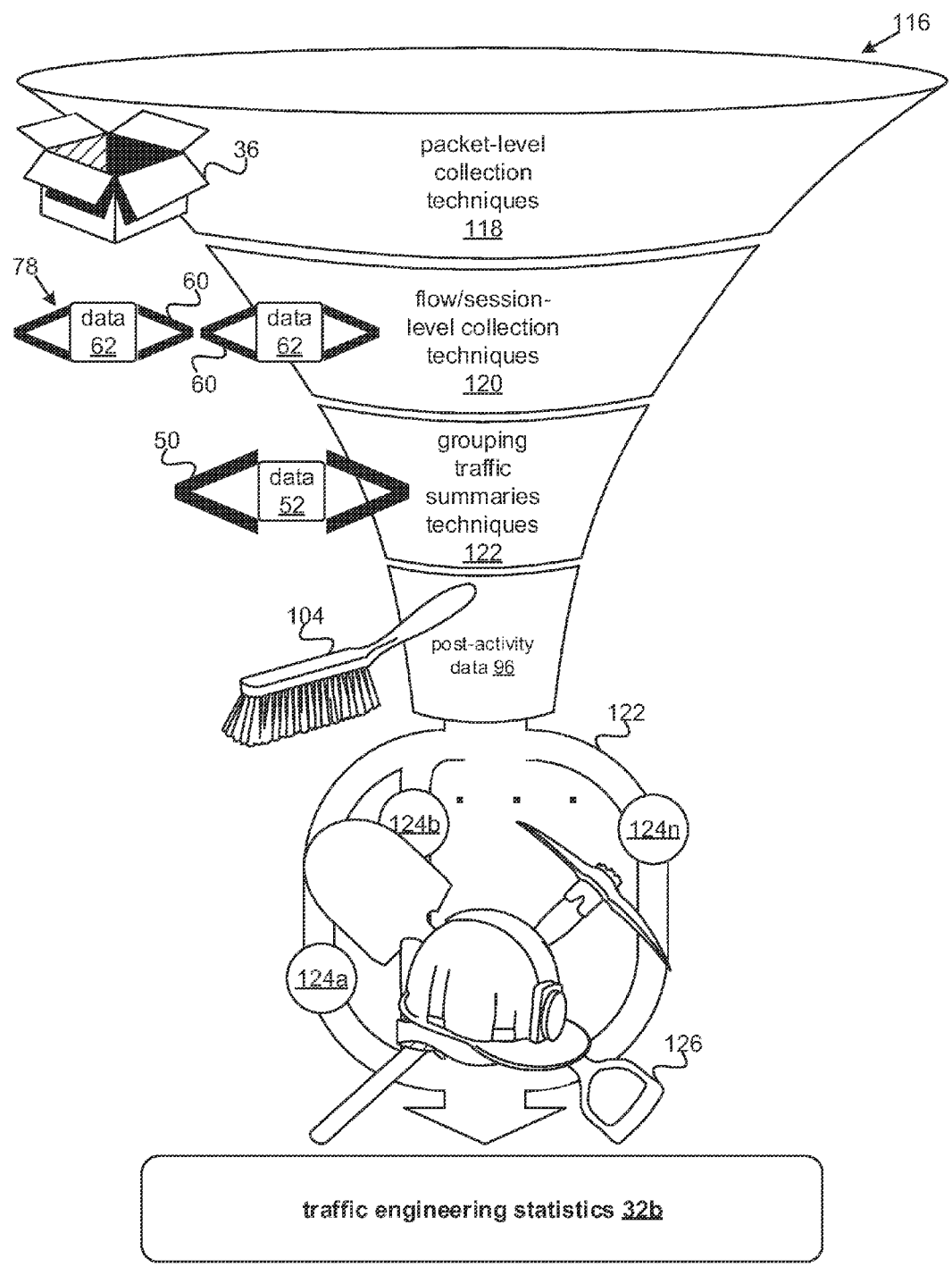
FIG. 6 is a schematic block diagram of different technologies, one or more of which may be applied to reduce a size of a data set, used to generate traffic statistics, for distributed, parallel processing, in accordance with examples.

Referring to FIG. 6, a set 116 of multiple techniques are referenced, one or more of which may be deployed to reduce the size of a data set 26 for processing with reduced resources and/or in a reduced amount of time. A packet-level technique 118, indicated at the top of a funnel depicting the set of techniques 116, is indicated by a packet symbol 36. As suggested by the relative size of a portion of the funnel depicting the set depicting packet-level collection techniques 118, discussed as prior art with respect to FIG. 2, such techniques may result in large data sets 26.

However, by selecting a connection based approach to packet switching in a data center, the size of the data set 26 may be significantly reduced by traffic-flow/traffic-tuple-level collection techniques 120, indicated by a depiction of a common tuple-traffic group 78 with multiple units of traffic-flow data 80 with units of source information 50, may result in significantly smaller data sets 26. As discussed with respect to FIG. 3, a traffic flow, or portion of a traffic flow, may include many packets 36. Consequently, there may be many fewer summaries of traffic where such summaries are made at the traffic-flow/traffic-tuple level, as opposed to the packet level.

Additionally, in implementations enforcing a common path of edges and nodes through the datacenter 10 on traffic flows with common source and destination end hosts 14 and/or virtual computing instances 56, a grouping-traffic-summaries technique 122 can be applied. As discussed with respect to FIG. 4, grouping-traffic-summaries techniques 122 may reduce the number of summaries of traffic in the data set 26 by combining multiple summaries of traffic-flow-level traffic sharing common identification/source/socket information 50.

As discussed with respect to the previous figure, a cleaning module 104 may engage in activity to reduce a size of the data set 26 for distributed, parallel processing 122. The cleaning module 104 may clean 106 aggregated data 100 from flow agents 44 across the datacenter 10 by removing one or more categories of information not utilized after the data set 26, which may be contained within one or more post-activity files 98, is distributed across multiple parallel processing channel 124a-n for data mining 126.

In some examples, the data mining 126 engaged in by a cluster 20 may involve combining traffic-flow/traffic-tuple and/or path-level reports aggregated from across a data center by an analytic controller 48. The granularity and/or reliability of the resultant traffic statistics 32b, however, may depend on the amount of path information embedded in the data set 26. Some path information may be included with the identification/source/socket information 50 correlated and/or bundled with traffic summary data 52. However, to improve granularity and/or reliability, additional information may be provided 108 to the data set 26 by a path module 110. Additional potential, non-limiting details about the activities of such a path module 110 are discussed with respect to the following figure.

Figure 7:
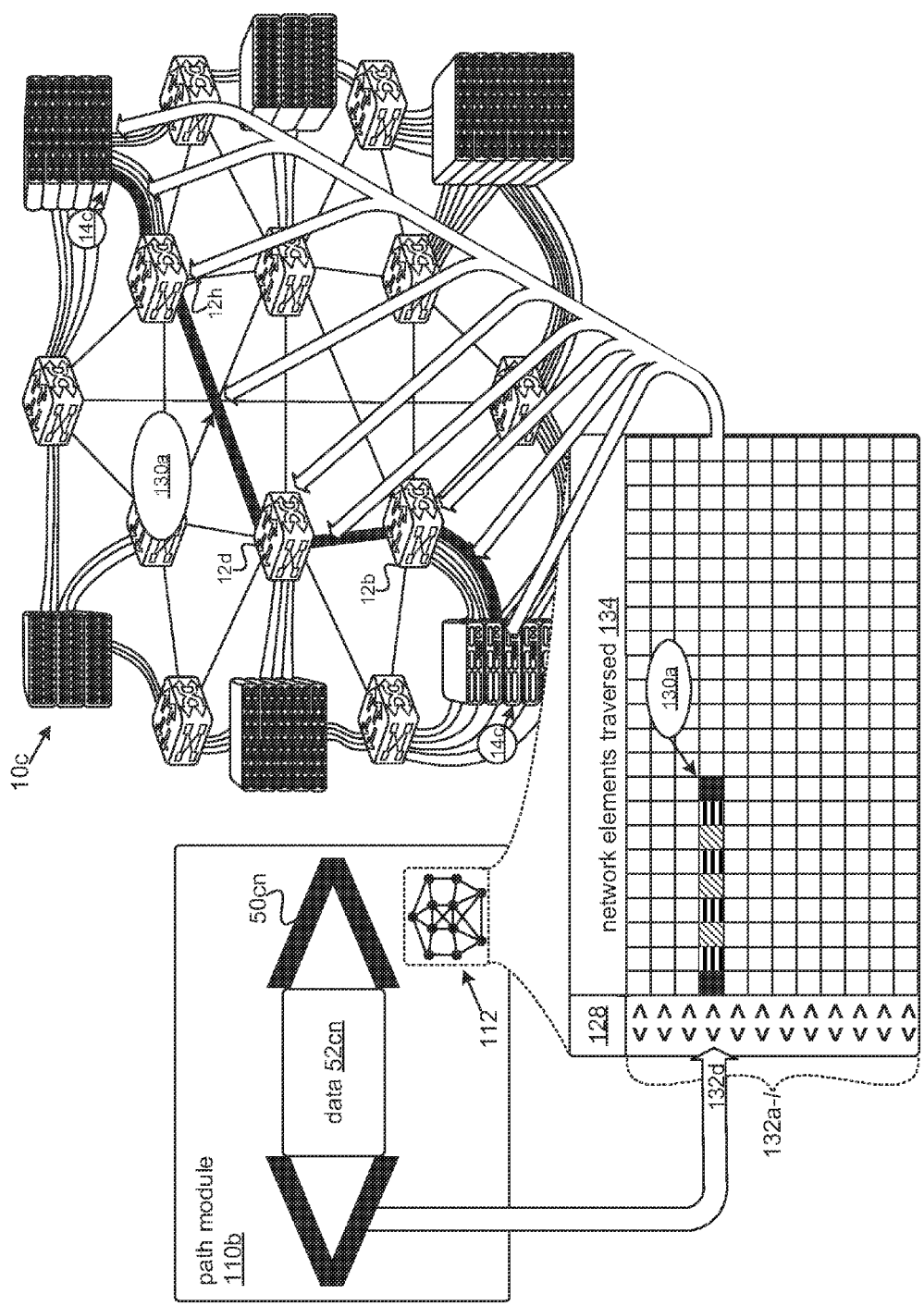
FIG. 7 is a schematic block diagram of a path module, at an analytic controller, using source information to determine path information for the generation of traffic statistics, in accordance with examples.

Referring to FIG. 7, a path module 110 is depicted. The path module 110 may be operable to maintain topology information 112 for the datacenter 10c. In some examples, the topology information 112 may include a lookup table 128. Additional and/or other types of topology information 112 are consistent with the disclosures herein. Examples of such lookup tables 128 may correlate/index different types/sets of identification/source/socket information 50 to different edges/links and/or vertices/nodes in a list describing a path 130 through a datacenter 10.

For example, and not by way of limitation, the lookup table 128 may include different rows 132 for different units of identification/source/socket information 50. In examples, where packet switching is implemented with connections and by enforcing a common path for packets with a common destination and source, a table 128 with information about those paths can be used to provide additional information to a data set 26, enabling high granularity and/or reliability for resultant traffic statistics 32. Similar information may be provided where common paths are not enforced for traffic with common sources and destinations from different traffic flows where the table 128 is updated for new traffic flows.

Such lookup tables 128 may provide partial and/or complete path information. In such examples, the path module 110 may alter pre-activity files 94 to create and/or contribute to post-activity files 98. The post-activity files 98 may carry paths 130, or path information, obtained by applying units of identification/source/socket information 50cn to the lookup table 128.

For example, different columns within the table 128 may provide identification information for different network elements traversed 134 in a series of network elements for a path 130a through the datacenter 10c. Such a path 130 may include a list of one or more edges/links and/or two or more node(s) traversed by data sent over a socket 86 described by the corresponding source/socket information 50. Hence, the path module 110b may apply a particular set of identification/source/socket information 50cn to the lookup table 128. The path module 110 may then acquire a series of network elements traversed 134 by the traffic summarized by the particular traffic-flow summary 52cn. Such network elements may be indexed to that particular set of identification/source/socket information 50cn by identification information in the column elements pertaining to the row 132d—the fourth row in FIG. 7—for the particular set of identification/source/socket information 50cn.

The two solid black squares in the table 128 may represent end hosts 14c, 14s and/or one or more virtual computing nodes 56 corresponding, respectively, to the source and destination of the exemplary path 130a depicted through the exemplary datacenter 10c. The horizontally cross-hatched elements in the table 128 may carry identification information for particular links/edges traversed; and the diagonally cross-hatched elements may indicate particular intermediate nodes, 12b, 12d, and 12h, traversed by the path 130a.

Figure 8:
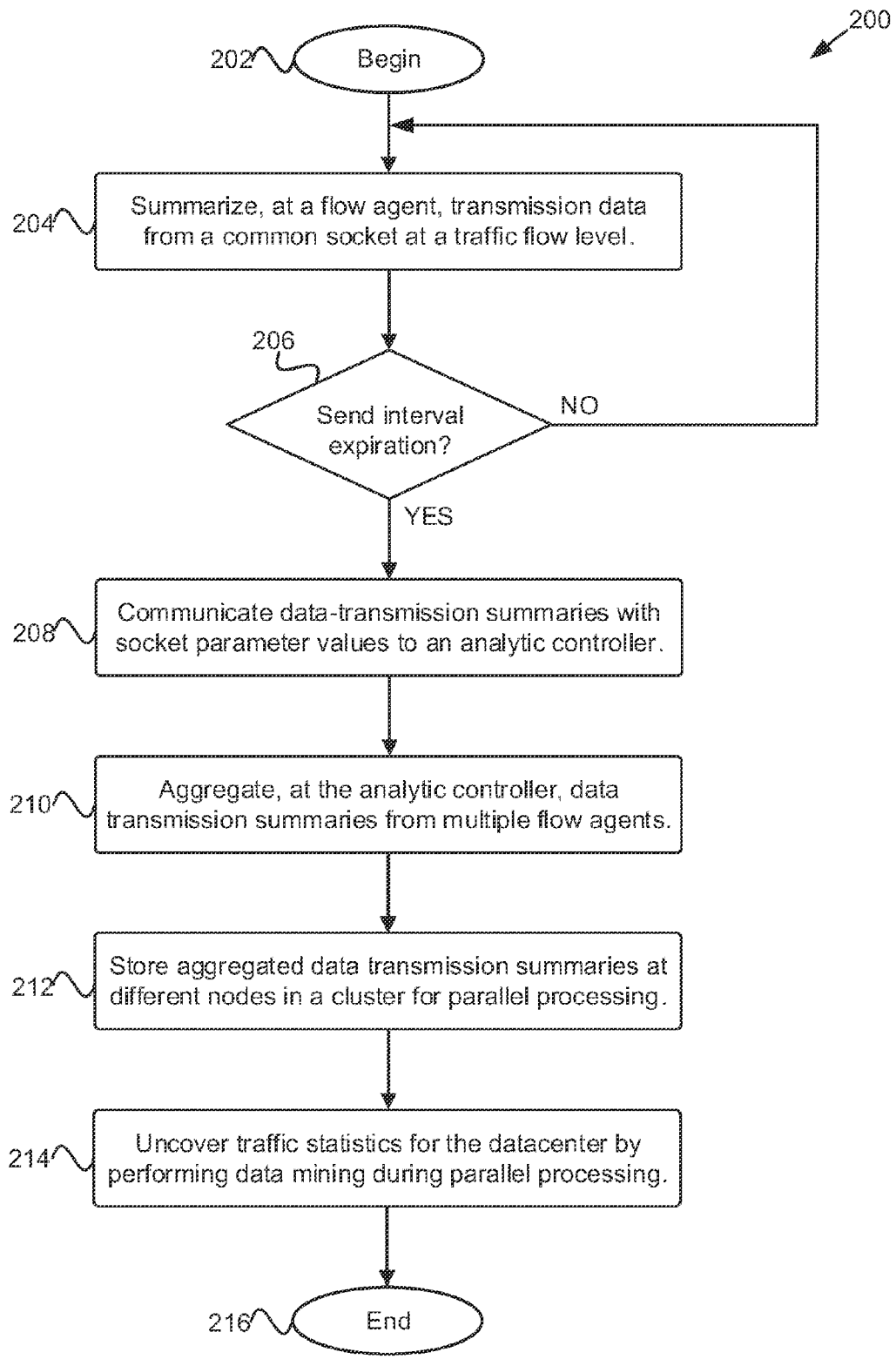
FIG. 8 is a flow chart of steps for generating traffic engineering statistics by summarizing traffic data, at various flow agents, for various sockets, aggregating the flow data, preprocessing it, and provisioning a manageable data set to a cluster of computing nodes for distributed, parallel processing, resulting in tailored, traffic-engineering statistics, in accordance with examples.

Referring to FIG. 8, methods 200 are depicted for calculating statistics 32 about traffic in a datacenter 10. The flowcharts in FIG. 8 illustrate the architecture, functionality, and/or operation of possible implementations of systems, methods, and computer program products according to examples. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block or blocks. These computer program instructions may also be stored in a computer readable medium that may direct a computer to function in a particular manner, such that the instructions stored in the computer-readable medium produce an article of manufacture including instruction means which implement the function/act specified in the flowchart and/or block or blocks. The computer program may also be loaded onto a computer to cause a series of operation steps to be performed on the computer or other programmable apparatus to produce a computer implemented process for the functions/acts specified in the flowchart and/or block or blocks.

It should also be noted that, in some alternative implementations, the functions noted in the blocks may occur out of the order noted. In certain embodiments, two blocks shown in succession may, in fact, be executed substantially concurrently, or the blocks may sometimes be executed in the reverse order, depending upon the functionality involved. Alternatively, certain steps or functions may be omitted.

Methods 200 consistent with FIG. 8 may begin 202 with one or more flow agents 44 at one or more end hosts in a datacenter 10. The flow agent(s) 44 may summarize 204 data transmissions across multiple packets 36 at a traffic-flow/tuple-traffic-group level for packets transmitted from one or more common socket(s) 86. In some examples, but not necessarily all examples, the operations of the flow agent(s) 44 may reference 206 a send interval 102. If the send interval 82 has not expired, the flow agent(s) 44 may continue to summarize 204 data transmissions. If the send interval 82 has expired, the flow agent(s) 44 may send, or communicate, 208 the data-transmission summaries 52.

Although not depicted, the step of referencing 206 the send interval 82, in some exemplary methods 200, may include one or more additional steps. Such steps may include, maintaining a counter at one or more flow agent(s) 44. The counter(s) may be referenced to determine 206 that a send interval 82 has elapsed. Also, the step of summarizing 204 may include summarizing traffic scheduled for transmission during the send interval 82 within a report 46.

The flow agent(s) may communicate 208 the data-transmission summaries 52 with corresponding socket parameter values 50 to an analytic controller 48. In examples where the summaries 52 have been summarized into reports 46, the flow agents 44 may communicate 208 the reports 46 to the analytic controller 48. Methods 200 may continue at the analytic controller 48, which may aggregate 210 data-transmission summaries 52 and accompanying socket parameter values 50 from multiple flow agents 44. The methods 200 may include a cluster 20 of computing nodes 14/56 which may or may not, either in part or in whole, pertain to the datacenter 10.

The cluster 20 and/or the analytic controller 48 may store 112 aggregated data-transmission summaries 100 at different nodes 14/56 within the cluster 20 of computing nodes 14/56 in preparation for parallel processing 214. The cluster 20 may perform data mining 126 during parallel processing 214 of the aggregated data-transmission summaries 100 within the cluster 20 of computing nodes 14/56 to uncover traffic statistics 32, and some examples of such methods 200 may end 216.

In some examples, the analytic controller 48 may maintain topology information 112 for the datacenter 10 at the analytic controller 48, the topology information 112 operable to convert identification/source/socket information 50 for a traffic flow/tuple-traffic group to a path 130 through the datacenter 10 described by one or more edge and/or node traversed by the traffic flow/tuple-traffic group. In such examples, a step of pre-processing the aggregated data-transmission summaries 100 may be included. The pre-processing step may include translating, with the topology information 112, the accompanying identification/source/socket information 50 into paths 130 of edges and nodes. In certain exemplary methods 200, the pre-processing step may include, in addition or in the alternative, pre-processing the aggregated data-transmission summaries 100 by removing sufficient data to accommodate parallel processing 214 within a range of predetermined times 102 by available computing resources in the cluster 20.

Certain methods 200 may also combine multiple instances of traffic statistics 32. In such examples, each instance of traffic statistics 32 may be generated by the cluster 20 for an incremental period of time 102 within the datacenter 10 through parallel processing 122. The combined multiple instances of traffic statistics 32 may result in traffic statistics 32 for the datacenter over an increased period of time, while avoiding parallel processing 122 of a larger data set 26 corresponding the increased period of time.

The present disclosures may be embodied in other specific forms without departing from their spirit or essential characteristics. The described examples are to be considered in all respects only as illustrative, not restrictive. The scope of the invention is, therefore, indicated by the appended claims, rather than by the foregoing description. All changes within the meaning and range of equivalency of the claims are to be embraced within their scope.

The invention claimed is:

1. A system for generating traffic statistics for a datacenter comprising:
   an end host in a datacenter, the end host comprising a memory, a processor, and a Network Interface Controller (NIC) to execute:
      summarizing traffic data at a level of a portion of a traffic flow between a computing node at the end host and a second computing node in the datacenter, and
      bundling the traffic data for the portion with source information for the traffic flow, and
      reporting the traffic data with source information to an analytic controller; and
   the analytic controller hosted by a computer in the datacenter comprising memory, a processor, and an NIC to:
      aggregating traffic data with bundled source information from multiple flow agents hosted by multiple end hosts in the datacenter to obtain aggregated traffic data; and
      retrieving, from a look up table, a list of links and nodes between the end host and the second computing node, the list of links and nodes between the end host and the second computing node corresponding to an enforced path between the end host and the second computing node, the list of links and nodes between the end host and the second computing node including two or more intermediate nodes;
      bundling the list of links and nodes between the end host and the second computing node with the aggregated traffic data; and provisioning the aggregated traffic data for traffic-statistic-producing parallel processing;
maintaining a counter operable to indicate when a grouping time period has expired;
combining traffic data for multiple traffic flows with a common source and destination within the grouping time period into a common tuple-traffic group, the common tuple-traffic group describable by common parameter values for the common source and destination within the source information used to transmit traffic flows belonging to the common tuple-traffic group, and combined traffic data summarizing the traffic scheduled for the common tuple-traffic group and comprising at least one of the traffic data summarizing the portion of the traffic flows and additional traffic data summarizing a second portion of a second traffic flow along the common tuple-traffic group; and
generating a pre-activity file with the combined traffic data and corresponding source information for communication to the analytic controller.

2. The system of claim 1, wherein the processor of at least one of the analytic controller and end host is further to execute:
making formatting changes to the aggregated traffic data required for processing the data set by a data-mining application operable for performing coordinated, parallel-processing on the computing nodes in the cluster of computing nodes.

3. The system of claim 2, wherein the cluster of computing nodes comprises a set of computing nodes within the datacenter.

4. The system of claim 2, wherein the paths enforced on packets with common destinations and sources are enforced with respect to a logical overlay, allowing multiple different physical paths within a single path at a level of the logical overlay.

5. The system of claim 2, wherein the processor of the analytic controller is further to execute aggregating the traffic data over a predetermined timeframe, the predetermined timeframe tuned to provide the data set:
of sufficient size to detect patterns for traffic flows in the data center; and
small enough to appropriately utilize the cluster to continuously provide relevant updates.

6. The system of claim 1, wherein the look up table comprises a plurality of lists, each list of the plurality of lists comprising at least one edge and at least two nodes traversed by traffic with a common destination and source.

7. The system of claim 1, the processor of the end host is further to execute:
collecting traffic data about data transmitted from multiple virtual computing instances supported by the end host; and
collating the traffic data to source information for the multiple virtual computing instances transmitting the traffic data.

8. The system of claim 1, the processor of the end host further to execute:
providing a system call emulation in user space, emulating a kernel system call to send data on a socket buffer; and
copying data metric information and copy source information from a send call to the system call emulation at the end host to transmit data within the datacenter over the a socket at the end host;
providing data metric information and to copy source information from a send call at the end host to transmit data within the datacenter over the a socket at the end host.

9. A method for calculating statistics about traffic within a datacenter, the method comprising:
summarizing, by a flow agent at an end host in a datacenter, data transmissions across multiple packets at, at least one of, a traffic-flow level and a traffic-tuple level for packets transmitted from a common socket;
communicate the data-transmission summaries with corresponding identification information to an analytic controller;
aggregate data-transmission summaries and accompanying identification information from multiple flow agents at the analytic controller;
store aggregated, data-transmission summaries at different nodes within a cluster of computing nodes in preparation for parallel processing;
maintaining topology information for the datacenter at the analytic controller, the topology information including a plurality of enforced paths including a list of one or more edges and two or more intervening nodes enforced on packets with common destinations and sources by a connection based packet switching protocol implemented by the datacenter and to convert identification information for at least one of a traffic flow and a tuple-traffic group to a path through the datacenter, the path described by at least one edge and at least two nodes traversed; and
pre-processing the aggregated data-transmission summaries by translating, with the topology information, the accompanying identification information into paths of edges and nodes and storing the paths of edges and nodes in the data transmission summaries; and
uncover traffic statistics for the datacenter by performing data mining during parallel processing of the aggregated data-transmission summaries within the cluster of computing nodes;
wherein the method further comprises, by the flow agent:
maintaining a counter to indicate when a grouping time period has expired;
combining traffic data for multiple traffic flows with a common source and destination within the grouping time period into a common tuple-traffic group, the common tuple-traffic group describable by common parameter values for the common source and destination within the source information used to transmit traffic flows belonging to the common tuple-traffic group;
generating combined traffic data summarizing traffic scheduled for the common tuple-traffic group; and
generating a pre-activity file with the combined traffic data and corresponding source information for communication to the analytic controller.

10. The method of claim 9, further comprising pre-processing the aggregated data-transmission summaries by removing sufficient data to accommodate parallel processing within a range of predetermined times by available computing resources in the cluster.

11. The method of claim 10, further comprising combining multiple instances of traffic statistics, each instance of traffic statistics generated for an incremental period of time within the datacenter through parallel processing, the combined multiple instances of traffic statistics resulting in traffic statistics for the datacenter over an increased period of time while avoiding parallel processing of a larger data set corresponding the increased period of time.

12. The method of claim 9, further comprising:
maintaining a counter at the flow agent;
referencing the counter to determine that a grouping period has elapsed;
summarizing traffic scheduled for transmission during the grouping period within a report; and
communicating the report to the analytic controller.

13. The method of claim 9, further comprising:
adding at least one of a new traffic flow and a new tuple-traffic group to a list of at least one of traffic flows and tuple-traffic groups to be monitored when a new socket, used to define the at least one of the new traffic flow and the new tuple-traffic group, is created; and
monitoring traffic scheduled for transmission from the new socket to collect traffic data summarizing data transmitted over the new socket.

\* \* \* \* \*